US008654951B1

(12) United States Patent
Olmsted et al.

(10) Patent No.: US 8,654,951 B1
(45) Date of Patent: Feb. 18, 2014

(54) METHOD AND APPARATUS FOR SYNCHRONIZING TRANSCRIPTS AND RECORDINGS OF A BRIDGE CONFERENCE AND USING THE SAME TO NAVIGATE THROUGH THE RECORDING

(75) Inventors: Gary Olmsted, Ashby, MA (US); John R. Klein, Dracut, MA (US)

(73) Assignee: Avay Inc., Basking Ridge, NJ (US)

( * ) Notice: Subject to any disclaimer, the term of this patent is extended or adjusted under 35 U.S.C. 154(b) by 1501 days.

(21) Appl. No.: 11/961,372

(22) Filed: Dec. 20, 2007

(51) Int. Cl.
*H04M 3/42* (2006.01)
*H04M 1/64* (2006.01)
*G06F 7/00* (2006.01)
*G06F 17/00* (2006.01)
*G06F 17/30* (2006.01)

(52) U.S. Cl.
USPC ....... 379/202.01; 379/67.1; 379/68; 455/416; 707/610; 707/617; 707/618; 707/705

(58) Field of Classification Search
USPC ......... 379/202.01, 88.14, 67.1, 68, 71, 88.13; 707/713, 610, 705, 618, 617; 715/202, 715/753; 709/204; 455/416
See application file for complete search history.

(56) References Cited

U.S. PATENT DOCUMENTS

| 5,859,974 | A * | 1/1999 | McArdle et al. | 709/204 |
|---|---|---|---|---|
| 7,130,404 | B2 * | 10/2006 | Coles et al. | 379/202.01 |
| 7,418,090 | B2 * | 8/2008 | Reding et al. | 379/202.01 |
| 7,865,501 | B2 * | 1/2011 | Ban et al. | 707/713 |
| 2004/0184586 | A1 * | 9/2004 | Coles et al. | 379/88.14 |
| 2005/0034079 | A1 * | 2/2005 | Gunasekar et al. | 715/753 |
| 2008/0276159 | A1 * | 11/2008 | Narayanaswami et al. | 715/202 |

* cited by examiner

*Primary Examiner* — Thjuan K Addy
(74) *Attorney, Agent, or Firm* — Anderson Gorecki & Rouille LLP (57) ABSTRACT

A method, apparatus and computer program product for synchronizing transcripts and recordings of a bridge conference is described. An audio file recording of a bridge conference is accessed as well as a transcript of events associated with the bridge conference. The transcript of events associated with the bridge conference is synchronized with the audio file recording of a bridge conference such that a user can utilize the transcript to navigate to a desired place in the audio file recording of a bridge conference.

16 Claims, 5 Drawing Sheets

METHOD AND APPARATUS FOR SYNCHRONIZING TRANSCRIPTS AND RECORDINGS OF A BRIDGE CONFERENCE AND USING THE SAME TO NAVIGATE THROUGH THE RECORDING

BACKGROUND

Teleconferencing can be defined as the real-time exchange of information between people who are not in the same physical space. Teleconferencing utilizes a conference call (sometimes referred to as a bridge conference) which is a telephone call in which three or more people converse simultaneously. Many companies use conference calls as a meeting tool or to distribute information to a large number of listeners at the same time.

Conventional conference calls connect people through a conference bridge, which is essentially a server that acts like a telephone and can answer multiple calls simultaneously. Software plays a large role in whether the bridge has capabilities beyond simply connecting multiple callers. A company can have its own bridge or can contract with a service provider for conference call hosting. Providers frequently offer add-on features for conference calls, such as attendee polling, call recording and in-call operators or attendants.

Since offices and employees can be thousands of miles apart, getting everyone into the same room for meetings and training has become decidedly impractical for a lot of companies. This is one of the reasons teleconferencing has become such a popular industry. Through teleconferencing, companies can conduct meetings, customer briefs, training, demonstrations and workshops by phone or online instead of in person.

The simplest phone teleconference is a three-way call, available in many homes as a service from the telephone company. Another very simple (but not necessarily effective) method is to have two groups of people talk to one another via speakerphone. The limits of three-way calling and the sound quality of speakerphones make both of these options impractical for most businesses.

Existing Bridge Conferencing Products have the ability to record a Bridge Conference for playback. There is also the ability (potentially) to keep track of everyone who was a part of the Bridge Conference (roster). Most, if not all, IM applications have the ability to keep transcripts of IM conversations. There are also "deep tagging" applications (for example, http://www.viddler.com/) where users can annotate and share annotations on streaming media content.

SUMMARY

Conventional mechanisms such as those explained above suffer from a variety of deficiencies. One such deficiency is that there is no way (currently) to be able to have a visual view of everyone who participated in a conference as well as their activity within the conference. There currently is no way to use this type of information to be able to be used in conjunction with the playback for a complete "picture" of what occurred (and when) within the conference. Therefore the person needing to get information about a bridge conference basically must listen to the entire playback . . . making it really inefficient to get a summary and/or to find main points within the conference. Also, it is hard to determine who was there and for how long. There are "deep tagging" applications (for example, http://www.viddler.com/) where users can annotate and share annotations on streaming media content, but nothing real time and oriented toward enterprise applications.

Embodiments of the invention significantly overcome such deficiencies and provide mechanisms and techniques that provide a method and apparatus for synchronizing a transcript and a recording of a bridge conference such that a user can use the transcript to navigate within the audio file to access a desired portion of the audio file. In a particular embodiment of a method for providing synchronization of a transcript and a recording of a bridge conference the method includes accessing an audio file recording of a bridge conference and accessing a transcript of events associated with the bridge conference. The method also includes synchronizing the transcript of events associated with the bridge conference with the audio file recording of a bridge conference such that a user can utilize the transcript to navigate to a desired place in the audio file recording of a bridge conference.

Other embodiments include a computer readable medium having computer readable code thereon for providing synchronization of a transcript and a recording of a bridge conference. The computer readable medium includes instructions for accessing an audio file recording of a bridge conference and instructions for accessing a transcript of events associated with said bridge conference. The computer readable medium further includes instructions for synchronizing the transcript of events associated with the bridge conference with the audio file recording of a bridge conference such that a user can utilize the transcript to navigate to a desired place in the audio file recording of the bridge conference.

Still other embodiments include a computerized device, configured to process all the method operations disclosed herein as embodiments of the invention. In such embodiments, the computerized device includes a memory system, a processor, communications interface in an interconnection mechanism connecting these components. The memory system is encoded with a process that provides synchronization of a transcript and audio recording of a bridge conference as explained herein that when performed (e.g. when executing) on the processor, operates as explained herein within the computerized device to perform all of the method embodiments and operations explained herein as embodiments of the invention. Thus any computerized device that performs or is programmed to perform up processing explained herein is an embodiment of the invention.

Other arrangements of embodiments of the invention that are disclosed herein include software programs to perform the method embodiment steps and operations summarized above and disclosed in detail below. More particularly, a computer program product is one embodiment that has a computer-readable medium including computer program logic encoded thereon that when performed in a computerized device provides associated operations providing synchronization of a transcript and audio recording of a bridge conference as explained herein. The computer program logic, when executed on at least one processor with a computing system, causes the processor to perform the operations (e.g., the methods) indicated herein as embodiments of the invention. Such arrangements of the invention are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein as embodiments of the invention. Software processes that operate in a collection of computerized devices, such as in a group of data communications devices or other entities can also provide the system of the invention. The system of the invention can be distributed between many software processes on several data communications devices, or all processes could run on a small set of dedicated computers, or on one computer alone.

It is to be understood that the embodiments of the invention can be embodied strictly as a software program, as software and hardware, or as hardware and/or circuitry alone, such as within a data communications device. The features of the invention, as explained herein, may be employed in data communications devices and/or software systems for such devices such as those manufactured by Avaya, Inc. of Lincroft, N.J.

Note that each of the different features, techniques, configurations, etc. discussed in this disclosure can be executed independently or in combination. Accordingly, the present invention can be embodied and viewed in many different ways.

Also, note that this summary section herein does not specify every embodiment and/or incrementally novel aspect of the present disclosure or claimed invention. Instead, this summary only provides a preliminary discussion of different embodiments and HI corresponding points of novelty over conventional techniques. For additional details, elements, and/or possible perspectives (permutations) of the invention, the reader is directed to the Detailed Description section and corresponding figures of the present disclosure as further discussed below.

BRIEF DESCRIPTION OF THE DRAWINGS

The foregoing will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Figure 1:
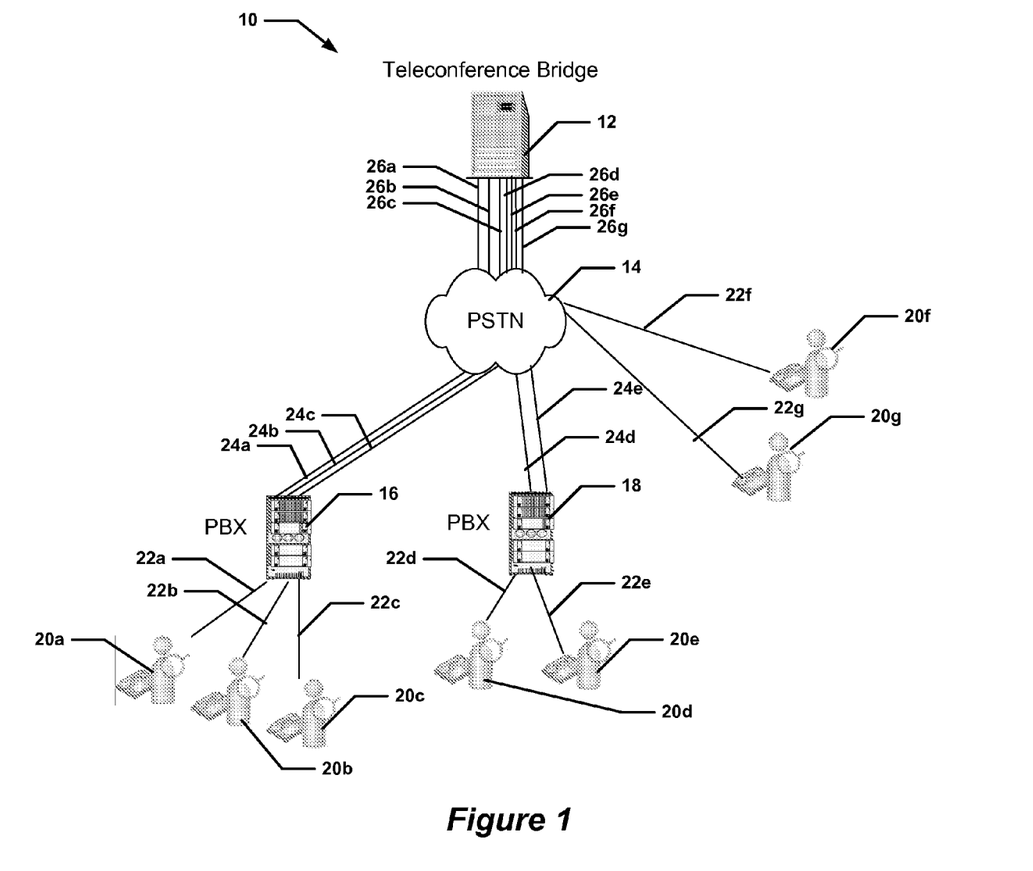
FIG. 1 depicts a block diagram of a bridge conferencing session.

Referring now to FIG. 1, a teleconferencing environment 10 is shown. The teleconferencing environment 10 includes a Voice Teleconference bridge 12 in communication with a PSTN 14. A first PBX 16 and a second PBX 18 are also in communication with PSTN 14. Also shown is a plurality of conference participants 20a-20f.

In an example operation, conference participants 20a-20f intend to dial into Voice Teleconference bridge 12 to participate in a teleconference. Site 1 participant 20a connected to PBX 16 by way of line 22a dials the number for the conference. From first PBX 16, the call is routed to PSTN 14 by way of trunk circuit 24a. From PSTN 14 to Voice Teleconference bridge 12, the call is routed along trunk circuit 26a. Site 1 participant 20a is now in communication with teleconference bridge 12 by way of line 22a, and trunk circuits 24a and 26a.

Site 1 participant 20b connected to PBX 16 by way of line 22b dials the number for the conference. From first PBX 16, the call is routed to PSTN 14 by way of trunk circuit 24b. From PSTN 14 to Voice Teleconference bridge 12, the call is routed along trunk circuit 26b. Site 1 participant 20b is now in communication with teleconference bridge 12 by way of line 22b, and trunk circuits 24b and 26b and is able to communicate with site 1 participant 20a.

Similarly, Site 1 participant 20c connected to PBX 16 by way of line 22c dials the number for the conference. From first PBX 16, the call is routed to PSTN 14 by way of trunk circuit 24c. From PSTN 14 to Voice Teleconference bridge 12, the call is routed along trunk circuit 26c. Site 1 participant 20c is now in communication with teleconference bridge 12 by way of line 22c, and trunk circuits 24c and 26c and is able to communicate with site 1 participant 20a and site 1 participant 20b.

Site 2 participant 20d connected to PBX 18 by way of line 22d dials the number for the conference. From second PBX 18, the call is routed to PSTN 14 by way of trunk circuit 24d. From PSTN 14 to Voice Teleconference bridge 12, the call is routed along trunk circuit 26d. Site 2 participant 20d is now in communication with teleconference bridge 12 by way of line 22d and trunk circuits 24d and 26d and is able to communicate with site 1 participants 20a, 20b and 20c.

In a similar manner Site 2 participant 20e connected to PBX 18 by way of line 22e dials the number for the conference. From second PBX 18, the call is routed to PSTN 14 by way of trunk circuit 24e. From PSTN 14 to Voice Teleconference bridge 12, the call is routed along trunk circuit 26e. Site 2 participant 20e is now in communication with teleconference bridge 12 by way of line 22e and trunk circuits 24e and 26e and is able to communicate with site 1 participants 20a, 20b and 20c and site 2 participant 20d.

Site 3 participant 20f dials the number for the conference and is routed to PSTN 14 by way of line 22f. From PSTN 14 to Voice Teleconference bridge 12, the call is routed along trunk circuit 26f. Site 3 participant 20f is now in communication with teleconference bridge 12 by way of line 22f and trunk circuit 26f and is able to communicate with site 1 participants 20a, 20b and 20c as well as site 2 participants 20d and 20e.

In order to provide a tool such that a person can navigate to a specific portion of a recording of a bridge conference a transcript of a bridge conference is produced using the events within that conference. This is similar to a transcript of an Instant Messaging (IM) session, but contain entries for all participants as they entered, exited, changed state, talked, etc. Having this information provides several capabilities to a user. The user has the ability to request that a transcript be mailed to the user upon Conference completion. Also, when the bridge conference ends, the transcript can be stored into a repository so that it could be reviewed later. The transcript can be indexed and made searchable using enterprise search technology. Further, during the conversation, the user could initiate other actions to users appearing in the transcript. For example, a user might see an entry that says:

11:03:24 AM Gary Olmsted is talking

When the user clicks on Gary Olmsted, they could initiate a side conversation with that person.

Additional capabilities provided by way of the present invention are the ability to use the transcript as a way of positioning the playback of a recorded conference. For example, clicking on the "Gary Olmsted is talking" could move the playback of a recorded conference to that place.

Further still, a moderator or operator, or any participant, of a conference is able to annotate the conference as it takes place. This would introduce additional points into the transcript wherein someone using the transcript to navigate playback. The annotations (tags) could be shared or private. Shared annotations have a network effect, identifying participants with common interests (based the participants making similar annotations).

Figure 2:
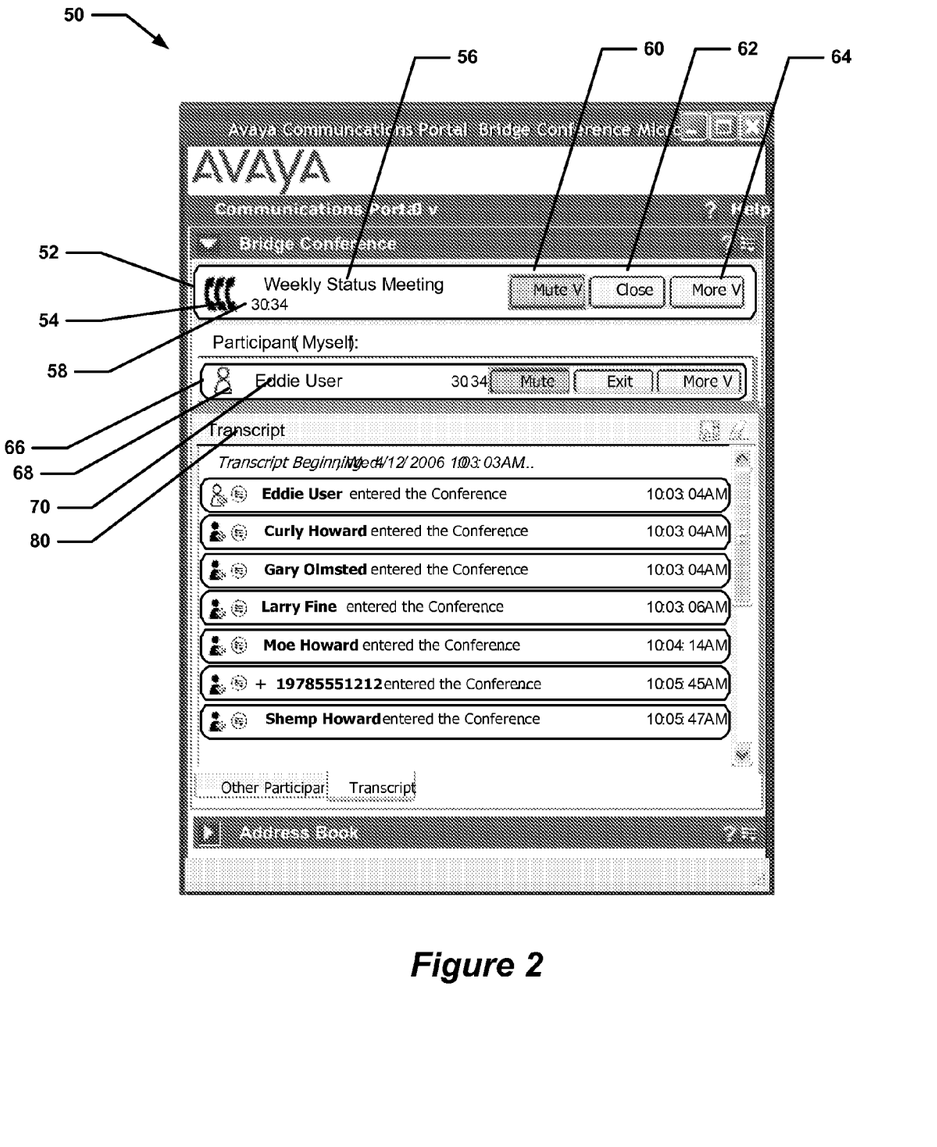
FIG. 2 depicts a screen shot of a transcript session for a bridge conference.

Referring now to FIG. 2, a screen shot of a transcript session 50 is shown. This transcript view allows participants to see a chronological history of what has occurred in the active bridge conference. The transcript view is made up of a conference area 52, a participant area 66 and a transcript area 80.

The conference area 52 shows the overall bridge conference. Users can see details about the conference and moderators can use this area for controlling the bridge conference. In a particular embodiment this area 52 includes an icon 54 used to represent both the type and the state of the bridge conference entry. Area 52 also includes a conference name 56, which is the name of the conference, and a running timer 58 for the conference.

Area 52 further includes a mute button 60, which allows the user to mute or un-mute the conference. Mute button 60 may also display the type of mute the Conference is in. These mute types include all, lecture and music. The all-mute condition mutes all participants and any participant as they are added. In this mode participants can un-mute themselves as needed. The lecture mute condition mutes all participants and any participant as they are added. In this mode participants cannot un-mute themselves. The music mute condition mutes all participants and any participant as they are added. Additionally, all participants hear music while muted. The close button 62 allows the moderator to close the overall bridge conference and the more button 64 presents the user with a context menu which has additional, less-frequently used actions.

The participant area 66 includes an icon 68 which represents both the type and the state of the participant entry. Also contained within participant area 66 is the participant name 68, which is the name or number for the user using the bridge conference application. A duration timer 72 shows how long the user has been participating in the bridge conference. A mute button 74 allows the user to mute or talk. Also contained in participant area 66 is an exit button 76, which allows the user to leave the Bridge Conference. A more button 78 presents the user with a context menu which has additional, less-frequently used actions. Context menu means that the contents and enablement of the entries within the menu change based on the participant state.

Transcript area 80 contains a scroll lock icon 82 that allows the user to lock the transcript in place. Normally, the transcript scrolls as entries appear in the list. Also shown is a clear icon 84 that allows the user to clear the transcript list. When the list is clear, a new entry line is stamped at the beginning to show when the transcript started.

Transcript area 80 displays transcript entries that can be of two types, namely, participant entries and conference entries. Examples of participant entries 100 are described with respect to FIG. 3, and examples of conference entries 150 are shown and describe with respect to FIG. 4.

Figure 3:
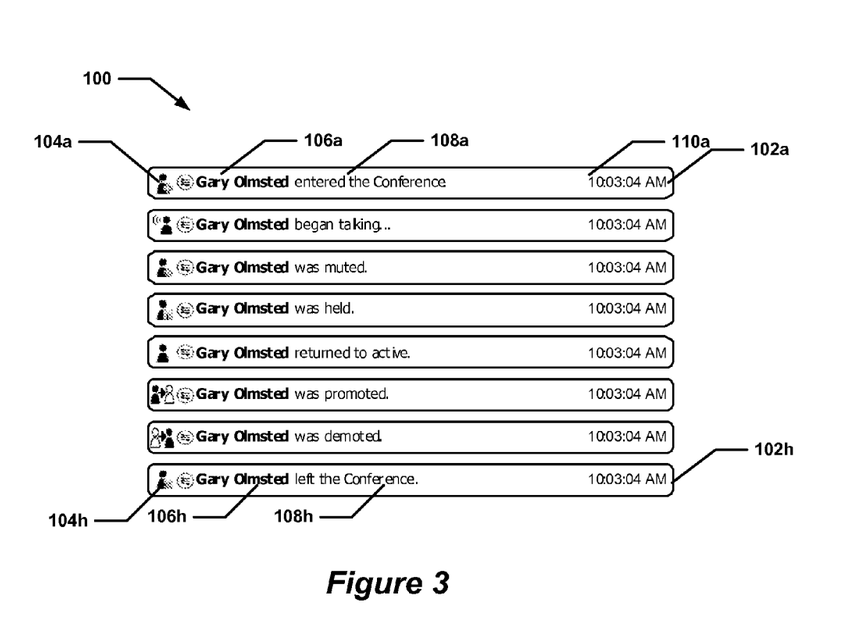
FIG. 3 depicts a screen shot of participant entries for a transcript session.

Referring now to FIG. 3, a series of participant entries 102a trough 102h are shown. Entry 102a includes an icon 104a that represents the event type or state for the participant event. Also shown are the participant name or number 106a and the participant event 108a, as well as the time 110a that the event occurred. A variety of different participant events 108a-108h are shown.

Figure 4:
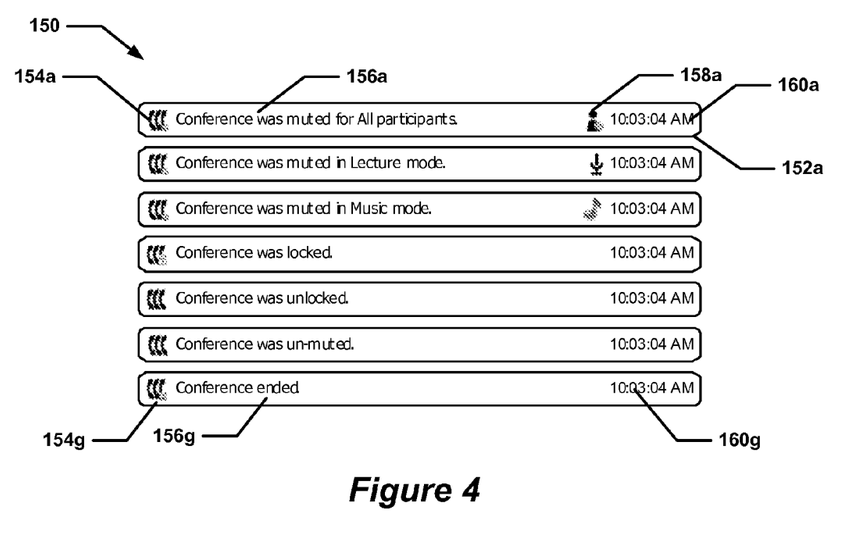
FIG. 4 depicts a screen shot of conference entries for a transcript session.

Referring now to FIG. 4, a series of conference entries 152a through 152g are shown. Entry 152a includes an icon 154a that represents the event type or state for the conference event. Also shown are the conference event 156a, as well as a mute type 158a and the time 160a that the event occurred. A variety of different conference events 156a-156g are shown.

The transcript is synchronized with an audio recording of the conference, and the transcript can be used to navigate to particular points within the audio recording of the conference. For example, the time stamps of the transcript can be linked to the time within the audio conference such that the transcript events are synchronized to the audio file. Thus, if the user wanted to navigate to the portion of the audio recording of when Gary Olmsted entered the conference, the user could click on that entry in the transcript of the conference and be brought to that time within the audio recording of the conference when Gary Olmsted joined the conference.

Figure 5:
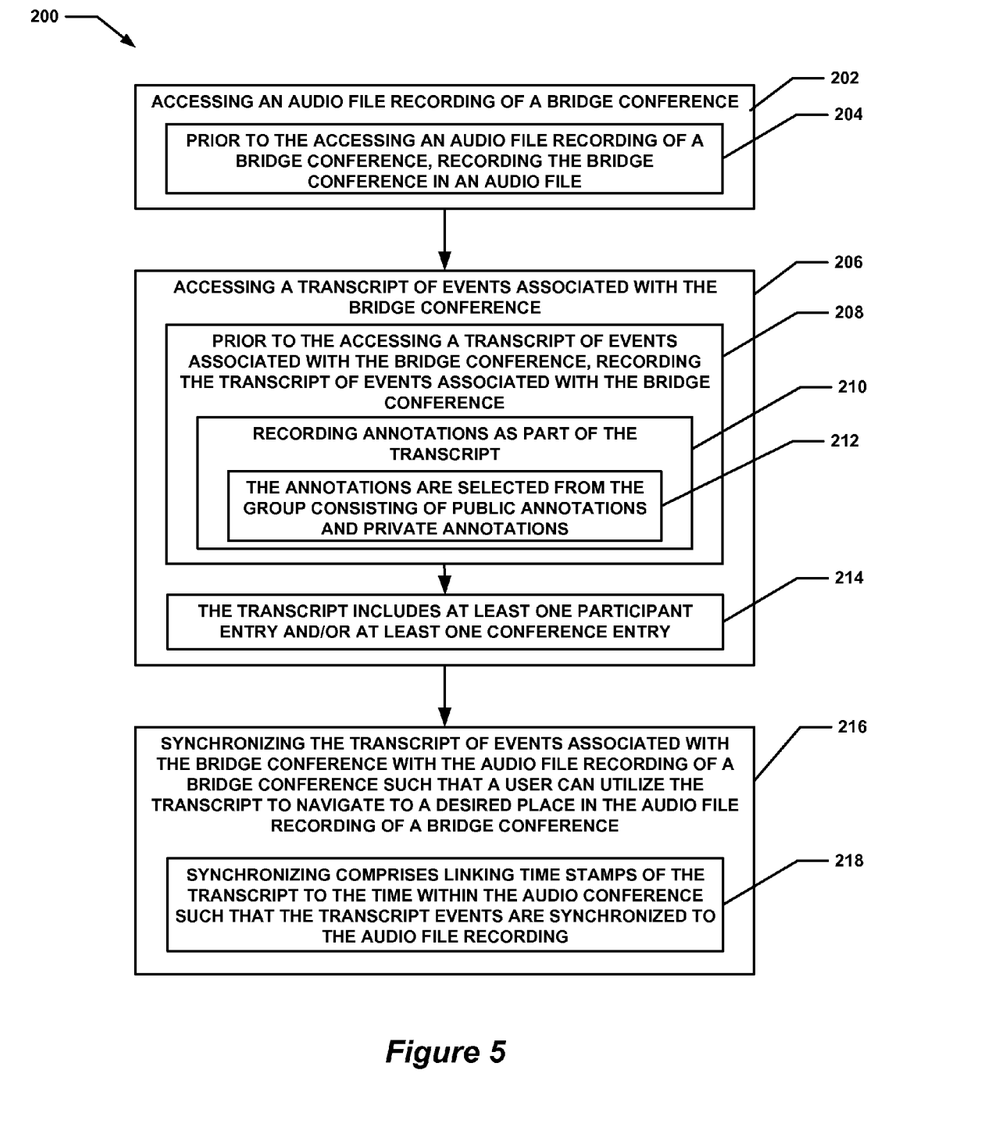
FIG. 5 depicts a flow diagram of a particular embodiment of a method of synchronizing a transcript and recording of a bridge conference in accordance with embodiments of the invention.

A flow chart of the presently disclosed method is depicted in FIG. 5. The rectangular elements are herein denoted "processing blocks" and represent computer software instructions or groups of instructions. Alternatively, the processing blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required in accordance with the present invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

Referring now to FIG. 5, a flow diagram of a particular embodiment of a method 200 for synchronizing transcripts and recordings of a bridge conference is shown. Method 200 begins with processing block 202 which discloses accessing an audio file recording of a bridge conference. Processing block 204 recites prior to the accessing an audio file recording of a bridge conference, recording the bridge conference in an audio file. In some embodiments the method may include first recording the audio conference, while other embodiments can utilize a previously recorded conference.

Processing block 206 recites accessing a transcript of events associated with the bridge conference. Processing block 208 recites, prior to the accessing a transcript of events associated with the bridge conference, recording the transcript of events associated with the bridge conference. In some embodiments the method may include first recording the transcript, while other embodiments can utilize a previously recorded transcript. As shown in processing block 210, annotations may be recorded as part of the transcript. As further recited in processing block 212, the annotations are selected from the group consisting of public annotations and private annotations. Processing block 214 discloses that the transcript may include at least one participant entry and/or at least one conference entry.

Processing continues with processing block 216 which recites synchronizing the transcript of events associated with the bridge conference with the audio file recording of a bridge conference such that a user can utilize the transcript to navigate to a desired place in the audio file recording of a bridge conference. As shown in processing block 218, in one embodiment this can be realized wherein the time stamps of the transcript could be linked to the time within the audio conference such that the transcript events are synchronized to the audio file.

The devices or computer systems that integrate with the processors may include, for example, a personal computers, workstations (e.g., Sun, HP), personal digital assistants (PDAs), handheld devices such as cellular telephones, laptops, handheld computers, or another devices capable of being integrated with a processors that may operate as provided herein. Accordingly, the devices provided herein are not exhaustive and are provided for illustration and not limitation.

References to "a microprocessor" and "a processor", or "the microprocessor" and "the processor," may be understood to include one or more microprocessors that may communicate in a stand-alone and/or a distributed environments, and may thus be configured to communicate via wired or wireless communications with other processors, where such one or more processor may be configured to operate on one or more processor-controlled devices that may be similar or different devices. Use of such "microprocessor" or "processor" terminology may thus also be understood to include a central processing unit, an arithmetic logic unit, an application-specific integrated circuit (IC), and/or a task engine, with such examples provided for illustration and not limitation.

Furthermore, references to memory, unless otherwise specified, may include one or more processor-readable and accessible memory elements and/or components that may be internal to the processor-controlled device, external to the processor-controlled device, and/or may be accessed via a wired or wireless network using a variety of communications protocols, and unless otherwise specified, may be arranged to include a combination of external and internal memory devices, where such memory may be contiguous and/or partitioned based on the application. Accordingly, references to a database may be understood to include one or more memory associations, where such references may include commercially available database products (e.g., SQL, Informix, Oracle) and also proprietary databases, and may also include other structures for associating memory such as links, queues, graphs, trees, with such structures provided for illustration and not limitation.

References to a network, unless provided otherwise, may include one or more intranets and/or the internet, as well as a virtual network. References herein to microprocessor instructions or microprocessor-executable instructions, in accordance with the above, may be understood to include programmable hardware.

Unless otherwise stated, use of the word "substantially" may be construed to include a precise relationship, condition, arrangement, orientation, and/or other characteristic, and deviations thereof as understood by one of ordinary skill in the art, to the extent that such deviations do not materially affect the disclosed methods and systems.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Although the methods and systems have been described relative to a specific embodiment thereof, they are not so limited. Obviously many modifications and variations may become apparent in light of the above teachings. Many additional changes in the details, materials, and arrangement of parts, herein described and illustrated, may be made by those skilled in the art.

Having described preferred embodiments of the invention it will now become apparent to those of ordinary skill in the art that other embodiments incorporating these concepts may be used. Additionally, the software included as part of the invention may be embodied in a computer program product that includes a computer useable medium. For example, such a computer usable medium can include a readable memory device, such as a hard drive device, a CD-ROM, a DVD-ROM, or a computer diskette, having computer readable program code segments stored thereon. The computer readable medium can also include a communications link, either optical, wired, or wireless, having program code segments carried thereon as digital or analog signals. Accordingly, it is submitted that that the invention should not be limited to the described embodiments but rather should be limited only by the spirit and scope of the appended claims.

What is claimed is:

1. A method comprising:
   recording a bridge conference in an audio file;
   accessing said audio file recording of a bridge conference;
   recording a transcript of events associated with said bridge conference and recording annotations as part of said transcript, wherein said annotations are selected from the group consisting of public annotations and private annotations;
   accessing said transcript of events associated with said bridge conference;
   synchronizing said transcript of events associated with said bridge conference with said audio file recording of a bridge conference such that a user can utilize the transcript to navigate to a desired place in said audio file recording of a bridge conference, wherein said synchronizing comprises linking time stamps of the transcript to the time within the audio conference such that the transcript events are synchronized to the audio file recording; and
   using said public annotations to identify participants with common interests.

2. The method of claim 1 wherein said transcript includes at least one of the group consisting of a participant entry and a conference entry.

3. A non-transitory computer readable medium having computer readable code thereon for synchronizing transcripts and recordings of a bridge conference, the medium comprising:
   instructions for recording a bridge conference in an audio file;
   instructions for accessing said audio file recording of a bridge conference;
   instructions for recording a transcript of events associated with said bridge conference and recording annotations as part of said transcript, wherein said annotations are selected from the group consisting of public annotations and private annotations;
   instructions for accessing said transcript of events associated with said bridge conference;
   instructions for synchronizing said transcript of events associated with said bridge conference with said audio file recording of a bridge conference such that a user can utilize the transcript to navigate to a desired place in said audio file recording of a bridge conference, wherein said synchronizing comprises linking time stamps of the transcript to the time within the audio conference such that the transcript events are synchronized to the audio file recording; and using said public annotations to identify participants with common interests.

4. The computer readable medium of claim 3 further comprising instructions for, prior to said accessing an audio file recording of a bridge conference, recording the bridge conference in an audio file.

5. The computer readable medium of claim 4 wherein said transcript includes at least one of the group consisting of a participant entry and a conference entry.

6. The computer readable medium of claim 4 wherein said instructions for synchronizing comprise instructions for linking time stamps of the transcript to the time within the audio conference such that the transcript events are synchronized to the audio file recording.

7. A computer system comprising:
a memory;
a processor;
a communications interface;
an interconnection mechanism coupling the memory, the processor and the communications interface; and
wherein the memory is encoded with an application for synchronizing transcripts and recordings of a bridge conference, that when performed on the processor, provides a process for processing information, the process causing the computer system to perform the operations of:
recording a bridge conference in an audio file;
accessing said audio file recording of a bridge conference;
recording a transcript of events associated with said bridge conference and recording annotations as part of said transcript, wherein said annotations are selected from the group consisting of public annotations and private annotations;

accessing said transcript of events associated with said bridge conference;
synchronizing said transcript of events associated with said bridge conference with said audio file recording of a bridge conference such that a user can utilize the transcript to navigate to a desired place in said audio file recording of a bridge conference, wherein said synchronizing comprises linking time stamps of the transcript to the time within the audio conference such that the transcript events are synchronized to the audio file recording; and
using said public annotations to identify participants with common interests.

8. The computer system of claim 7 further comprising, prior to said accessing an audio file recording of a bridge conference, recording the bridge conference in an audio file.

9. The computer system of claim 7 wherein said transcript includes at least one of the group consisting of a participant entry and a conference entry.

10. The computer system of claim 7 wherein said synchronizing comprises linking time stamps of the transcript to the time within the audio conference such that the transcript events are synchronized to the audio file recording.

11. The method of claim 1 wherein said participants with common interests have made similar annotations.

12. The computer readable medium of claim 3 wherein said participants with common interests have made similar annotations.

13. The computer system of claim 7 wherein said participants with common interests have made similar annotations.

14. The method of claim 1 wherein said transcripts of events includes entries for all participants as a participant enters, exits, changes state and speaks.

15. The computer readable medium of claim 3 wherein said transcripts of events includes entries for all participants as a participant enters, exits, changes state and speaks.

16. The computer system of claim 7 wherein said transcripts of events includes entries for all participants as a participant enters, exits, changes state and speaks.

* * * * *